W. P. PIGGOTT.
Telegraph Cable.
No. 50,314.
2 Sheets—Sheet 1.
Patented Oct. 3, 1865.
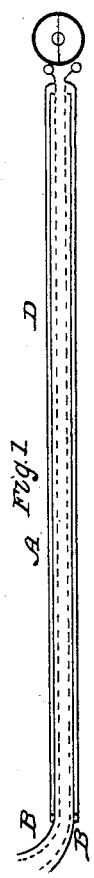
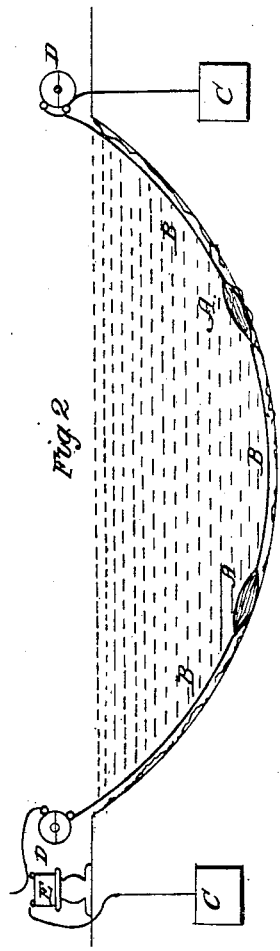
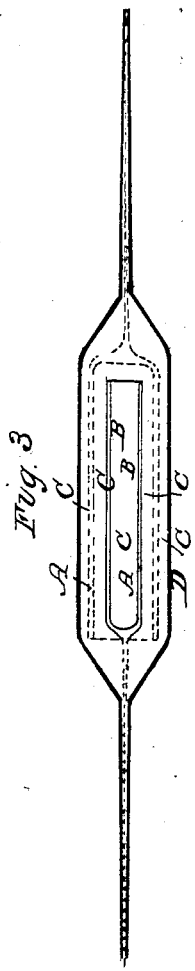

W. P. PIGGOTT.
Telegraph Cable.
No. 50,314.
2 Sheets—Sheet 2.
Patented Oct. 3, 1865.
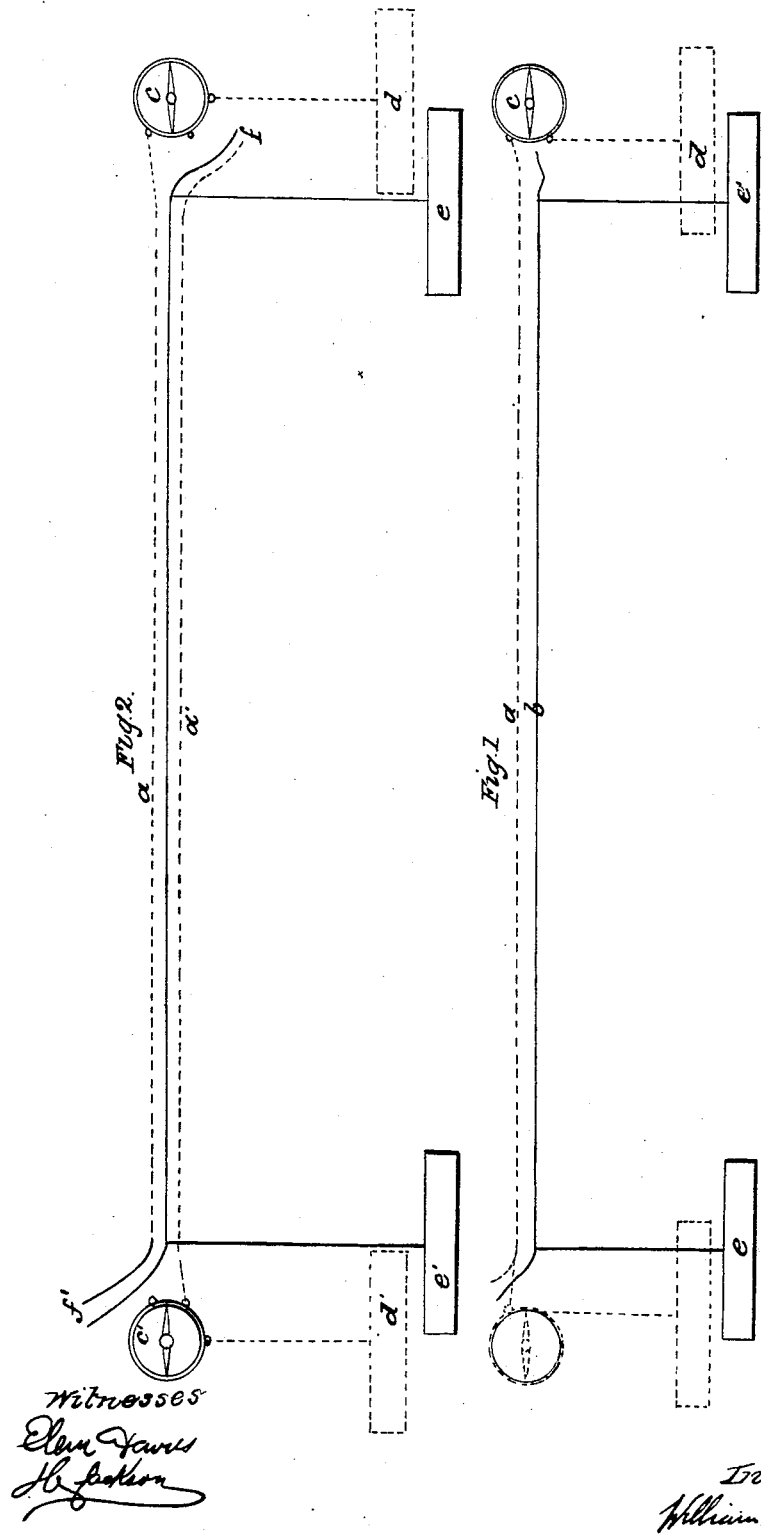

UNITED STATES PATENT OFFICE.

WILLIAM PETER PIGGOTT, OF LONDON, ENGLAND.

IMPROVEMENT IN TELEGRAPH-CABLES.

Specification forming part of Letters Patent No. 50,314, dated October 3, 1865.

*To all whom it may concern:*

Be it known that I, WILLIAM PETER PIGGOTT, of Argyl Street, (Regent Street,) London, have invented Improvements in Electric Telegraph-Cables and in Transmitting Signals Therethrough; and I do hereby declare that the following is a full, clear, and exact description of the same.

This invention has for its object improvements in the mode of obtaining or generating electric currents, in combination with telegraph cables or wires.

It has hitherto been the practice to generate the electric currents required for submarine cables by means of a battery or magnetic apparatus at the sending end, the galvanic or magnetic current evolved being of sufficient force to produce its effect on an instrument at the other end of the cable or receiving-station. Now, currents of electricity or magnetism, as is well known, in their passage through the wire excite within it a resistance which increases according to certain ratio between the distance and force. Thus, however well a cable or wire may preserve its insulation for a short distance, when the electric charge has to be augmented, in order to reach a station more remote the resistance consequent upon this increase of the force produces a leakage, and thence sooner or later the failure of the current to arrive at the distant station.

The first part of this invention relates to certain novel constructions and arrangements of electric telegraph-cable and apparatus connected therewith, whereby facility is afforded for making use of the induced electricity of the cable and for sending either single messages in one direction or any number of messages in opposite directions at the same time, according to the number of circuits contained in the cable.

The second part relates to a mode or method of utilizing old or damaged cables of the ordinary construction by the aid of the induced electricity of the cable itself.

My mode of remedying the defect above referred to consists in so constructing the cable that it shall at all times retain a static electric charge; or, in other words, so that a cable or the wire or wires of a telegraph-cable may co-operate as agents with the generating-surface, by which means such cable or wire or wires will be kept in a constant static condition, and consequently will require but very small power for the production of the required force. According to one mode of carrying out the invention, I employ various elements and combinations of elements for the production of voltaic currents, and these may be varied according to the circumstances. In this mode of constructing a cable capable of generating currents of electricity and of effecting reverse currents when required, I propose to make a copper or other wire circuit in the cable, placing the instrument or galvanometer in such circuit at the distant station, this wire or circuit to be partially insulated and each half of the circuit to be separate one from the other and from metallic contact with each other, and worked into a strand or strands of hemp saturated with a solution of the chlorides of one of the following salts, videlicit: calcium, lithium, or magnesium, or any other deliquescent salt, and afterward passed through powdered lime or gypsum. The cable so far constructed may then have a covering of a metal wire or wires of a different electric property or condition from that of which the metal circuit is made, producing in this manner a static condition of such cable. The outer wires may be covered with hemp or jute thoroughly tarred or otherwise coated with any partially-insulating material. Now this cable is capable of producing its effects at a distant station by bringing either end of the wire circuit in contact by means of a commutator with the other elements of the cable, and which may be either the wire covering or the core of the cable, such cable being at all times in a static condition. A battery of small power (and which I prefer to be an insulated one) having the inner circuit of the cable in connection with one pole of it, and the other pole of the battery being made to make and break contact with the other element of the cable, signals will be transmitted through it from end to end.

Another mode of carrying out this part of my invention is by means of a single line-wire, and this I term my "ganglionic cable;" and it differs from the previous arrangements, inasmuch as, instead of making the whole length of the cable a generator, I form it in ganglions, or a series of nodules analogous to nervous centers, which act as generators from one to the other along the whole line of cable and at such distances as will keep the line statically charged. In this case I bring the ends of my cable to earth-plates, as in the ordinary method. I use a wire coated with any insulating material and afterward worked into a hempen cable, which may be coated with iron or in any of the ordinary ways; but I do not require the same insulation, as when the current of electricity is forced by a powerful battery, as has hitherto been the case. In this cable the static charge requires but very slight power to give it the force requisite for telegraphic purposes. Further, I can combine any number of wires and generators in the same cable, so as to be able to send several messages and in each direction at one and the same time.

My generators are constructed either cylindrical or of any other convenient form. They are composed of two or more plates of dissimilar metal, separated by a compost formed of chalk or gypsum or other calcareous earth, well ground, with a solution of one or more of the chlorine salts, either used separately or combined, and inclosed in a partially or wholly insulated case, which may be made of bituminized paper, gutta-percha, india-rubber, stoneware, glass, or metal, the inside of which may be lined with some insulating material.

According to another method I construct a cable with not less than two wires of opposite electrical properties if messages are required to be sent in one direction only at one time; but if it be desired to send two or more messages in the same or in opposite directions at one time, I employ as many copper or other wires of the same electrical property as may be necessary.

Fig. 1, Sheet 1, represents one form of cable in section, showing how it generates through its whole length. The red lines (marked A) show the metallic circuit. The blue lines (marked B) is the opposite metal, and which I prefer to be of tinned iron or galvanized iron, and may be either internal or external to that marked A. The space between the lines A and B will be of hemp, saturated, as before mentioned. The black lines (marked D) represent the outer covering of hemp or jute combined with tar or any other partially-insulating substance.

Fig. 2 shows a cable with its generators submerged. A A, generators on the line-wire, marked B B; C C, earth-plates; D D, galvanometer; E, battery.

Fig. 3 shows a longitudinal section of a simple generator. A A, the negative cylinder or plate; B B, the positive cylinder or plate, each with its continuous wire for connecting with the cable; C C C C, the compost; D, the outer covering, which may be hermetically sealed.

Fig. 1, Sheet 2, of the drawings represents a diagram of my simplest form of cable, composed of two wires only of opposite denominations, whereby I am enabled by the induced electricity of the cable and its earth-plates to transmit a message in one or other direction at will. *a* is a copper wire, and *b* a galvanized-iron wire, which may either be the core or the outer covering, or, if preferred, the iron and copper wires may be laid in one spiral or strand, but insulated from each other in the usual or other manner, but not necessarily what is generally employed for electrical insulation, from the fact of the cable not requiring battery-power to overcome the inductive resistance thereof. One end of the copper wire is connected to the receiving-instrument *c*, which instrument is in direct connection with the earth by the earth-plate *d*, of the same electrical denomination as the wire *a*. The iron wire *b* is also in direct communication at each end with earth by the earth-plates *e e'*, of the same electrical denomination. In order to transmit a message, it is simply necessary to bring the two wires *a* and *b* in contact with each other at the sending end, when the disturbance of the induced electricity thereby produced will cause the necessary deflection of the receiving-instrument or galvanometer *c*. In sending messages the copper wire at the sending end must be for the time being detached from the receiving-instrument, but connected with the receiving-instrument at the opposite end, which I have shown in dotted lines in Fig. 1.

Fig. 2 represents a diagram of a more perfect arrangement, whereby messages can be received and sent simultaneously. In this arrangement I employ not less than three wires—namely, two copper wires, *a a'*, and one iron wire, *b*, or one copper and two iron wires, all insulated from each other. Any number of wires may be used, according to the number of circuits required. To one end of the copper wires *a* is connected a galvanometer or other suitable recording-instrument, *c*, which is in connection with earth by a negative plate, *d*, or plate of the same electrical denomination as the wire. The opposite end of the other copper wire, *a'*, is similarly connected to a galvanometer or other suitable recording-instrument, *c'*, which is also in connection with earth by a plate, *d'*, of the same electrical denomination as the wire *a'*. The iron wire *b* is connected at each end with earth by a plate, *e e'*, of the same or a similar electrical denomination as the wire. A cable of this construction will at all times be filled with induced electricity, or be statically charged like the Leyden jar, and it is the disturbance of this charge which, by operating upon the instrument at the distant end, produces the desired signals. This disturbance is effected by simply bringing by means of a commutator, the opposite wires or elements of the cable into contact with each other at the points *f f'*.

Old or damaged cables which have been intended to be worked by battery-power, but which have become useless by reason of defective insulation, may be readily worked by my system of the induced electricity, since perfect insulation is not actually necessary. The power or quantity of the induced electricity in the cable may be increased to any desired extent by increasing the size of the earth-plates before referred to; but should there be no continuity of iron in the cable, then I propose to produce the inductive state of the cable by introducing at one or more parts of the cable the ganglions, before described, consisting of positive and negative elements, each in connection with the conducting-wire, but insulated from each other, each ganglion forming in itself a small battery of just sufficient power to keep the cable charged.

It is obvious that cables in the condition above described may be made to transmit signals by the means described in reference to Fig. 1, the iron covering of the cable answering the purpose of the wire $b$ and being similarly connected with earth, while the conducting or copper wire will serve the purpose of the wire $a$ and be similarly connected with a receiving-instrument and with earth.

In some cases, where necessary—as, for example, in rocky or stony ground—I propose to embed the earth-plates in a compost of earth saturated with diliquescent salts—such, for example, as chlorine salts or sea-water—the object being to increase the inductive action at the shore ends of the cable; or, if preferred, the same effect may be produced by making the insulating medium of the shore ends of the cable less perfect.

I claim—

1. The method of giving a static charge to a cable, and the means by which this is accomplished, as is set forth, and the manner in which I construct my generators, and which are equally capable of being used either on land or submerged in sea or other water for telegraphs, and which may be used for other purposes.

2. The application and use to and in the transmission of electric signals of statically-charged cables constructed and worked in the manner hereinbefore described.

3. The combination, in an electric cable, of two wires or series of wires of opposite electrical denomination, one of such wires or series of wires being connected with earth at each end by corresponding earth-plates, while the other wire or series of wires is connected to a galvanometer or receiving-instrument which is itself connected with earth by a corresponding earth-plate.

4. The combination, in an electric cable, of two or more wires or wire strands, of one electrical denomination connected through a galvanometer or receiving-instrument with earth and of a wire core or covering of opposite electrical denomination in permanent connection with earth at each end, as hereinbefore described.

5. The application of my ganglions to old or damaged cables of the ordinary construction, for the purpose of working the same by the aid of induced electricity, in the manner hereinbefore described.

In testimony whereof I have signed my name to this specification in the presence of two subscribing witnesses.

WILLIAM PETER PIGGOTT.

Witnesses:
ELEM DAVIES,
I. E. JACKSON.